United States Patent Office

3,137,738
Patented June 16, 1964

3,137,738
ACETAL PRODUCTION
Ronald K. June, Pleasant Hill, and John C. Rapean, Walnut Creek, Calif., assignors to Shell Oil Company, New York, N.Y., a corporation of Delaware
No Drawing. Filed Jan. 24, 1961, Ser. No. 84,484
4 Claims. (Cl. 260—615)

This invention relates to the preparation of dialkyl acetals of alkenals and, in particular, to a method for preparing acetals of alpha,beta-unsaturated acyclic alkenals. More particularly, it relates to an improved method for preparing dialkyl acetals of acrolein.

Unsaturated aldehydes, particularly those having their olefinic double bond in the alpha,beta-position, are reactive both at the double bond and through the carbonyl grouping. The alpha,beta-olefinic aldehydes are extremely reactive because of the conjugation of the olefinic and carbonylic double bonds. Indeed, the alpha,beta-olefinic double bond of such alkenals, because of the conjugation, is as reactive toward most carbonyl reagents as the carbonylic group itself. As a consequence, acetal-forming reactions which proceed smoothly with such saturated aldehydes as acetaldehyde are unsuited for the alpha,beta-olefinic alkenals because of the ease with which the undesired double bond addition takes place.

As a consequence, the preparation of acetals of such alkenals by reaction with an alkanol is frequently accompanied by the formation of alkoxy alkanals, formed by addition of the alkanol at the double bond. For example, when ethanol is reacted with acrolein in the presence of an acid catalyst, the two principal reactions which take place are the acetal-forming reaction (1)

(1) 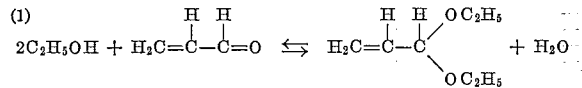

and the beta-ethoxypropionaldehyde-forming reaction (2)

(2) 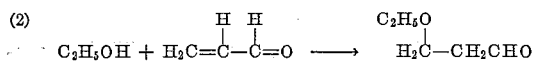

The relative rates of the two reactions depend on the variables of the reaction system, particularly the temperature of the reaction medium, the rate of removal of the products, and the concentration of the acid catalyst.

One mode of promoting the formation of acetals in such systems has been to heat the reaction system so that the product water of reaction (1) has been azeotroped out of the reaction medium, thus driving the reaction in the direction of the acetal. Such procedures are described, for example, in the patent to Myers et al., U.S. 2,678,950, issued May 18, 1954; and the patent to Thomas, U.S. 2,691,049, issued October 5, 1954. However, because of the reactivity of the alkenals employed, the relatively high temperature of the reaction also promotes such side reactions as polymerization of the alkenal itself with consequent formation of undesirable high-molecular weight by-products. Furthermore, during the azeotroping perceptible amounts of reactants are carried over and must be separated from the azeotrope and returned to the reaction zone. In order to obtain economically attractive yields of acetals, relatively long reaction times, on the order of 12–24 hours, are required in this method.

It is an object of this invention to provide an improved process for preparing diacetals of alkenals in high yield. Another object of the invention is the provision of a process for preparing these acetals rapidly and economically. Still another object is a process for preparing dialkyl acetals of alkenals in a readily recoverable form, free from such undesired by-products as alkoxy alkanals and polymerized alkenals. An improved process which does not require heating the reaction system in order to produce the acetals in high yield is another object of the invention. A particular object of the invention is an improved process for the preparation of dialkyl acetals of such alpha,beta-unsaturated acetals, such as acrolein and methacrolein.

These objects are accomplished in the invention by the process which comprises reacting together at a temperature below about 25° C. an acyclic alkenal and an alcohol, said reaction being conducted in a solvent comprising essentially a water-immiscible inert organic liquid, whereby the product water forms a separate phase, and recovering the alkenal dialkyl acetal from the organic phase.

The acyclic alkenals whose diacetals are prepared by the process of the invention are those aliphatic aldehydes consisting of a hydrocarbon portion having at least one olefinic double bond on an otherwise saturated chain, and a formyl group —CHO attached to a chain carbon atom. Typical of such alkenals are methacrolein, crotonaldehyde, tiglaldehyde, and the like. Preferred alkenals are those having up to 9 carbon atoms, and particularly preferred, because of their availability and reactivity, are the alpha,beta-unsaturated alkenals having the structure

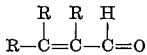

wherein R is selected from the group consisting of the hydrogen atom and alkyl radicals. Preferred alkyl radicals are those having up to 6 carbon atoms. Most preferred alpha,beta-unsaturated alkenals are those, however, having no more than eight carbon atoms, since these are most available and most reactive.

Typical of such alkenals are alpha-ethylacrolein, alpha-hexylacrolein, beta-ethylacrolein, beta-pentylacrolein, crotonaldehyde, and the like. Of these, the most preferred embodiment is acrolein which is the most reactive of the noted class.

The alkenal described is reacted in the process of the invention with an alcohol at a temperature below about 25° C. By alcohol is meant an acyclic alcohol comprising an alkyl or alkenyl group having a hydroxyl group attached to one of the carbon atoms. Typical of such alcohols are methanol, ethanol, propanol, isopropanol, butanol, sec-butanol, the pentanols, the hexanols, isooctanol, and the like. Such unsaturated alcohols as allyl alcohol, methallyl alcohol, oleyl alcohol and the like, are also suitable. Preferred alcohols are the lower normal and secondary alkanols, particularly those having up to four carbon atoms, since the resulting acetals are especially useful as polymers, copolymers and intermediates. Of the alcohols described, the most preferred is methanol because the dimethyl acetals are attractive for a variety of uses as indicated.

The reactants are preferably employed in about stoichiometric ratio, that is, two moles of alcohol per mole of alkenal, although higher ratios, up to about five moles of alcohol per mole of alkenal, may be conveniently employed.

It is desirable to conduct the reaction between the alkenal and the alcohol in the presence of an acidic catalyst. Preferred catalysts are miscible strong acids, particularly such mineral acids as sulfuric acid, hydrochloric acid or hydrofluoric acid. However, strong organic acids, such as the toluenesulfonic acids, including p-toluenesulfonic acid; haloacetic acids such as chloroacetic and trichloroacetic acid, and the like, may also be used. Equally suitable are such solid acidic catalytic materials as resinous ion-exchange materials in the H+ form, such as the Dowex, Amberlite, Duolite and Permutit resins. Only a catalytic amount of the acidic material is required, and this amount depends on the acid and the nature of the reaction system in which it is employed. In general, amounts of acid on the order of 0.01 to about 1 mole percent, based on the alkenal, will be required.

The process of the invention will be described in terms of the two most favored reactants, acrolein and methanol. It should be understood, however, that other alkenals and alcohols, as set forth above, may be employed without altering the nature of the process.

An important feature of the process of the invention is the conduct of the process in the liquid phase, at a temperature below about 25° C. Heretofore, it has been believed that below 25° C. the rate of the acetal-forming reaction would be so slow that the process would be undesirably uneconomical. Furthermore, it has been necessary to conduct the reaction at higher temperatures so that the water produced in the reaction could be azeotroped out of the reaction mixture, thus driving the equilibrium to the right.

It has, however, unexpectedly and contrary to the teachings of the art, been discovered that the reaction takes place at satisfactory rates at temperatures below about 25° C., an entirely satisfactory rate being obtained over a range of from about −10° C. to about 20° C. The temperatures may be achieved in the reaction system by allowing the reaction to proceed at room temperature without heating, employing unheated reactants, or it may be obtained by cooling the reaction mixture or employing one or more precooled reactants.

The reaction of the acrolein, or other alkenal, and the methanol, or other alcohol, is conducted in a substantially water-immiscible inert organic liquid. The organic solvent should be one liquid at temperatures above about −10° C. and having a boiling point enough removed from that of the acetal being produced to permit its ready separation. Furthermore, a specific gravity differing appreciably from that of the by-product water phase is preferred so that the solvent containing extracted product may be removed from the reaction mixture by simple phase separation. The solvent should be substantially immiscible with water at temperatures from about −10° C. to about 25° C., preferably being soluble in water to the extent of no more than about 1% by weight at about 20° C.

Among the inert organic liquids meeting these requirements are the hydrocarbons, particularly the paraffins having five or more carbon atoms. Such paraffins include hexane, heptane, octane, nonane, decane, undecane, dodecane, and the like, as well as mixtures thereof. Other suitable solvents include aromatic liquids such as benzene, toluene, xylenes and ethyl benzene, as well as such halogenated hydrocarbons as ethylene dichloride, methylene dichloride, carbon tetrachloride, and the like. In addition to their inertness and water immiscibility, a desirable feature of these solvents is their ability to remain liquid at the temperature at which the reaction is conducted.

When acrolein and methanol are reacted together at a temperature below about 25° C. dispersed in an inert water-immiscible organic liquid by agitation under the conditions described, the two products are acrolein dimethyl acetal and water. The acetal formed, being far more soluble in the solvent phase than in the aqueous phase, is continuously and effectively removed from the locus of the reaction, effectively driving the equilibrium to the right. In this way high yields of acrolein acetal are obtained without the necessity of azeotroping, phase separation of the azeotropic mixture, or return of the separated reactants to the reaction mixture. Furthermore, such separation of acetal and product water is essential not only to obtain high acrolein conversions but also to prevent reversion and azeotrope formation in the acetal recovery steps.

To illustrate the high yields and favorable equilibria obtained when the invention is practiced as described, the following tabulation of effective equilibrium constants as a function of temperature is provided. Such effective values do not represent true chemical equilibrium because excessive contacting will allow losses of the components by slower competing and subsequent reactions, giving undesirable higher molecular weight products. They do, however, show the limit to maximum yields which can be obtained at optimum contact times.

TABLE I

| Experiment | Reaction Conditions | | | | | Percent Conversion | | Acetal Yield, Percent M on Acrolein | Equil. Const. K, Liters, ×10³ M |
| --- | --- | --- | --- | --- | --- | --- | --- | --- | --- |
| | Temp., °C. | Time, Hrs. | Alkanol Employed | Mole Ratio, Alkanol/ Acrolein | $H_2SO_4$ Conc'n Eq./Mole Acrolein | Acrolein | Alkanol | | |
| 1 | 22 | 0.5 | Ethanol | 2 | 0.005 | 19 | 20 | (107) | 5.6 |
| 2 | 24 | 3.0 | ---do--- | 2 | 0.005 | 16 | 18 | 99 | 3.3 |
| 3 | 22 | 0.5 | ---do--- | 4 | 0.005 | 31 | 16 | 96 | 4.4 |
| 4 | 24 | 3.0 | ---do--- | 4 | 0.005 | 27 | 15 | 97 | 3.3 |
| 5 | −8 | 3.0 | ---do--- | 2 | 0.005 | 27 | 26 | 88 | 7.8 |
| 6 | −10 | 5.0 | ---do--- | 2 | 0.005 | 30 | 26 | 91 | 11 |
| 7 a | −4 | 5.5 | ---do--- | 2 | 0.001 | 39 | 35 | (104) | 34 |
| 8 | 19 | 0.6 | Methanol | 2 | 0.0013 | 36 | 33 | 98 | 19 |
| 9 | 21 | 1.8 | ---do--- | 2 | 0.0013 | 34 | 31 | 100 | 16 | a Extractive reaction using 3 volumes n-dodecane per volume reactants.

It will be seen from these data that the equilibrium constant improves as the temperature is reduced. Furthermore, the extracting effect when a solvent is used, as in Experiment 7, results in additional improvement at reactant conversion and hence the calculated equilibrium position.

It is an important advantage of the invention that the product acetal is separated from the locus of the reaction, that is, the alcohol-rich aqueous phase, as rapidly as it is produced, and without the necessity of azeotroping, thus, effecting higher yields of acetal product by driving the reaction somewhat to the right. Additional stages of solvent contact, either batchwise or continuous in nature, can be provided if it is desired to further increase the reactant conversions. The hydrocarbon phase, which is substantially water-free, may easily be separated from the aqueous phase by simple mechanical methods, thus reducing the amount of reactants lost and unwanted byproducts formed.

In order to avoid side reactions taking place during recovery, it is desirable to first neutralize the catalyst. This may conveniently be done with a mild base, such as sodium bicarbonate, copper carbonate, or the like. Recovery of the product acetal and unreacted materials, as well as the solvent, may then be easily effected.

Since the separation of the products is inherent in this extractive reaction technique, recovery of the acrolein acetal is easily effected. The water phase, which forms as the lower layer of the liquid system when employing a hydrocarbon as solvent is readily drawn off from below. The organic phase, comprising the product portions of the unreacted acrolein and alkanol and the solvent, may then be passed from the reaction zone to suitable recovery means. For example, the organic phase may be neutralized and scrubbed with water to remove the alcohol, and the remaining organic components separated by fractional distillation or other similar techniques. The unreacted alkenal and alcohol, together with the solvent, may then be recycled to the reactor, if desired.

To illustrate the novel process of the invention, the following examples are given. It should be understood, however, that these examples are merely illustrative and are not to be regarded as limitations to the appended claims, since the basic teachings thereof may be varied at will as will be understood by one skilled in the art. In the examples the proportions are expressed in parts by weight unless otherwise noted.

*Example I.—Acrolein Dimethyl Acetal*

To a 20-gallon Pfaudler kettle was charged 100 lbs. Shell TS–1 Solvent (a mixture of paraffinic hydrocarbons having a boiling point from 157°–182° C., a specific gravity about 0.787, and an average molecular weight of 128), 18.4 lbs. of methanol, 15.9 lbs. of acrolein, and 0.091 lb. concentrated sulfuric acid. The reactants were maintained with stirring at about 0° C. for five hours, at the end of which time they were separated into an upper organic layer and a lower aqueous layer.

At the end of that time, analyses of both layers showed that about 50% conversion of each of the reactants had taken place, and that, based on the acrolein converted, a 12.6 lb. yield of acrolein dimethyl acetal (89.6% m.) was obtained in the organic phase. The product was worked up by separating the aqueous layer and distilling the products from the organic layer to afford the acetal. Only 1.3 lbs. of heavy ends were produced in the course of the reaction.

*Example II.—Acrolein Diethyl Acetal*

To a 20-gallon Pfaudler reactor was charged 88 lbs. of Shell TS–1 Solvent, 26 lbs. of ethanol, 15.7 lbs. of acrolein, and 0.091 lb. of sulfuric acid. The mixture was maintained at 0° C. with stirring for five hours, at the end of which time it was separated into two layers.

Analysis of the hydrocarbon upper layer showed a yield of about 12.2 lbs. of acrolein diethyl acetal. The extract layer was worked up as in the previous example.

We claim as our invention:

1. In the process of preparing the dialkyl acetal of an alkenal by reacting together an acyclic alpha,beta-unsaturated alkenal of up to nine carbon atoms and an alkanol of up to four carbon atoms in a water-immiscible hydrocarbon liquid solvent in the presence of a catalyic amount of acid, the improvement which comprises conducting the reaction at a temperature below about 25° C., whereby the product water forms a separate phase, and recovering the dialkyl acetal from the organic phase comprising said solvent and the alkenal acetal formed in the reaction mixture.

2. The process of claim 1 wherein the alkenal is acrolein and the alkanol is methanol.

3. The process for preparing the acetal of acrolein which comprises reacting together at a temperature below about 25° C. acrolein and an alcohol selected from the group consisting of alkanols and alkenols of up to eight carbon atoms, said reaction being conducted in a solvent comprising essentially a water-immiscible hydrocarbon liquid, and in the presence of an acidic catalyst, whereby the product water forms a separate phase, and recovering the acrolein acetal from the organic phase comprising said solvent and the acrolein acetal formed in the reaction mixture.

4. The process for preparing acrolein dimethyl acetal which comprises reacting together at a temperature below about 25° C. acrolein and methanol, said reaction being conducted in a solvent comprising essentially a water-immiscible paraffinic liquid, and in the presence of an acidic catalyst, whereby the product water forms a separate phase, and recovering the acrolein dimethyl acetal from the organic phase comprising said solvent and the acrolein acetal formed in the reaction mixture.

References Cited in the file of this patent

UNITED STATES PATENTS

| | | |
|---|---|---|
| 1,312,186 | King et al. | Aug. 5, 1919 |
| 2,573,678 | Saunders | Nov. 6, 1951 |